United States Patent [19] [11] Patent Number: 6,058,419
Taniguchi [45] Date of Patent: May 2, 2000

[54] COMMUNICATION NETWORK CONTROL SYSTEM AND CONTROL METHOD THEREFOR

[75] Inventor: Daisuke Taniguchi, Tokyo, Japan

[73] Assignee: NEC Corporation, Tokyo, Japan

[21] Appl. No.: 08/960,256

[22] Filed: Oct. 29, 1997

[30] Foreign Application Priority Data

Oct. 30, 1996 [JP] Japan ................................. 8-287185

[51] Int. Cl.⁷ .................................................. G06F 13/00
[52] U.S. Cl. ........................ 709/223; 709/226; 709/238; 709/248
[58] Field of Search ................................. 709/218, 223, 709/226, 236, 238, 244, 246, 253, 248; 707/10; 340/825.2, 825.21, 825.22; 370/498, 503

[56] References Cited

U.S. PATENT DOCUMENTS

| | | | |
|---|---|---|---|
| 5,319,644 | 6/1994 | Liang | 370/452 |
| 5,390,182 | 2/1995 | Zheng | 370/236 |
| 5,491,690 | 2/1996 | Alfonsi et al. | 370/54 |
| 5,530,842 | 6/1996 | Abraham et al. | 709/221 |
| 5,684,959 | 11/1997 | Bhat et al. | 709/224 |
| 5,818,842 | 10/1998 | Burwell et al. | 370/397 |

*Primary Examiner*—Zarni Maung
*Assistant Examiner*—Jason D. Cardone
*Attorney, Agent, or Firm*—Sughrue, Mion, Zinn, Macpeak & Seas, PLLC

[57] ABSTRACT

Upon opening traffic of a communication line passing a plurality of cross-connect devices (nodes), the cross-connect control information of each node input by the operator is input to be transmitted to each node via the network control device. In this case, redundancy of the network control information is avoided to reduce the control information amount. Since the sender and destination path names and the sender and destination leading time slot numbers between mutually opposing nodes are respectively the same, by a man-machine interface device, there are input the same information to respectively add the path name and the leading time slot number before and after respective node numbers. The cross-connection control information of all of nodes are transmitted to the network control device with a single network control information. In the network control device, the cross-connect control information per node is separated from the single network control information for re-construction.

10 Claims, 6 Drawing Sheets

FIG.2

| NETWORK CONTROL INFORMATION |
|---|
| LINE NAME |
| LINE SPEED |
| CONNECTION TYPE : CROSS-CONNECT |
| PATH NAME (PATH A) |
| LEADING TIME SLOT NUMBER |
| CONTROL OBJECTIVE NODE NUMBER (NODE 1) |
| PATH NAME (PATH B) |
| LEADING TIME SLOT NUMBER |
| CONTROL OBJECTIVE NODE NUMBER (NODE 2) |
| PATH NAME (PATH C) |
| LEADING TIME SLOT NUMBER |
| CONTROL OBJECTIVE NODE NUMBER (NODE 3) |
| PATH NAME (PATH D) |
| LEADING TIME SLOT NUMBER |
| CONTROL OBJECTIVE NODE NUMBER (NODE 4) |
| PATH NAME (PATH E) |
| LEADING TIME SLOT NUMBER |

DATA SIZE OF CONTROL INFORMATION
(PER ONE FRAME OF NETWORK CONTROL COMMAND)
[INTEGER DATA × 11 + CHARACTER STRING DATA × 6]

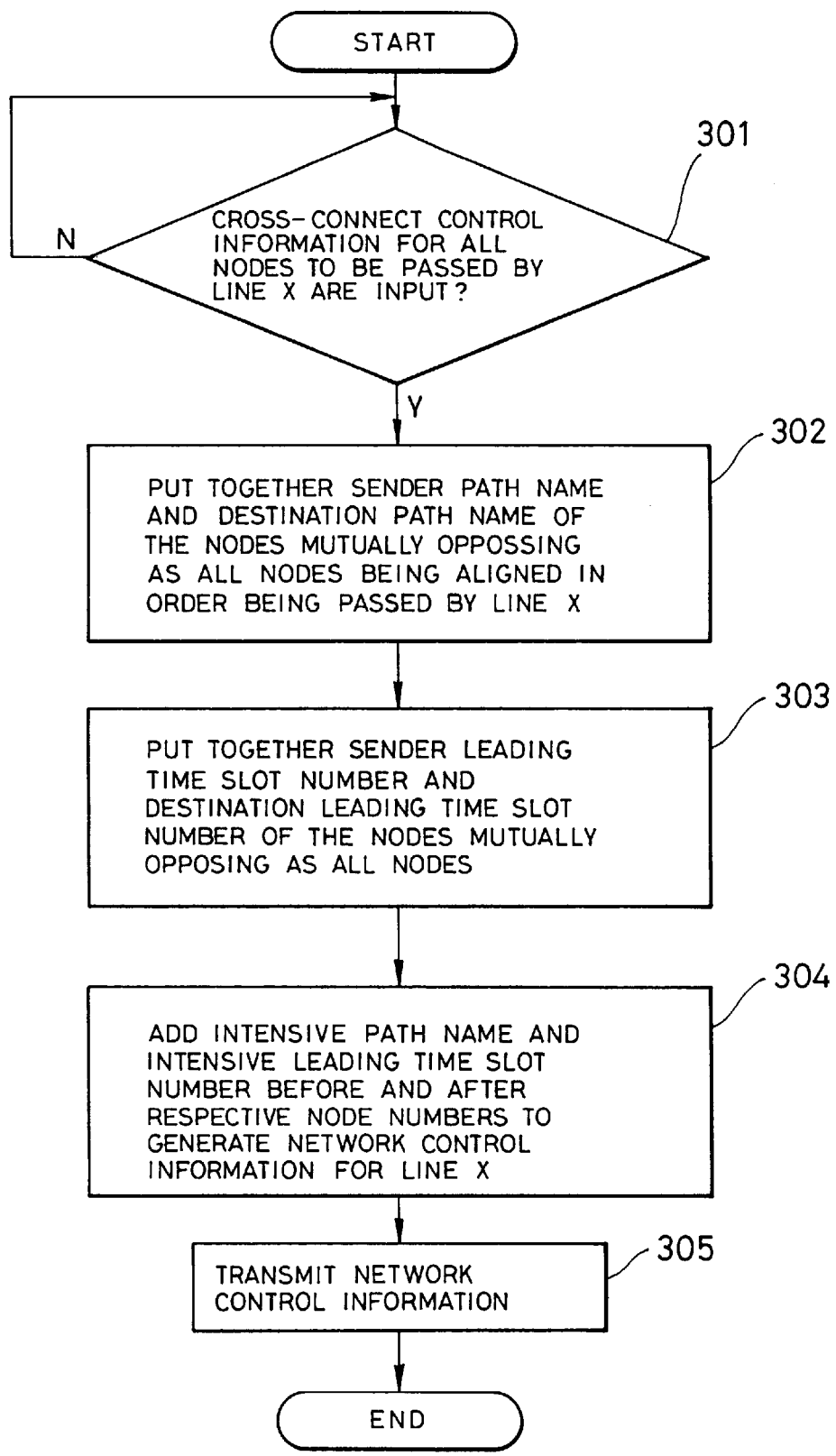

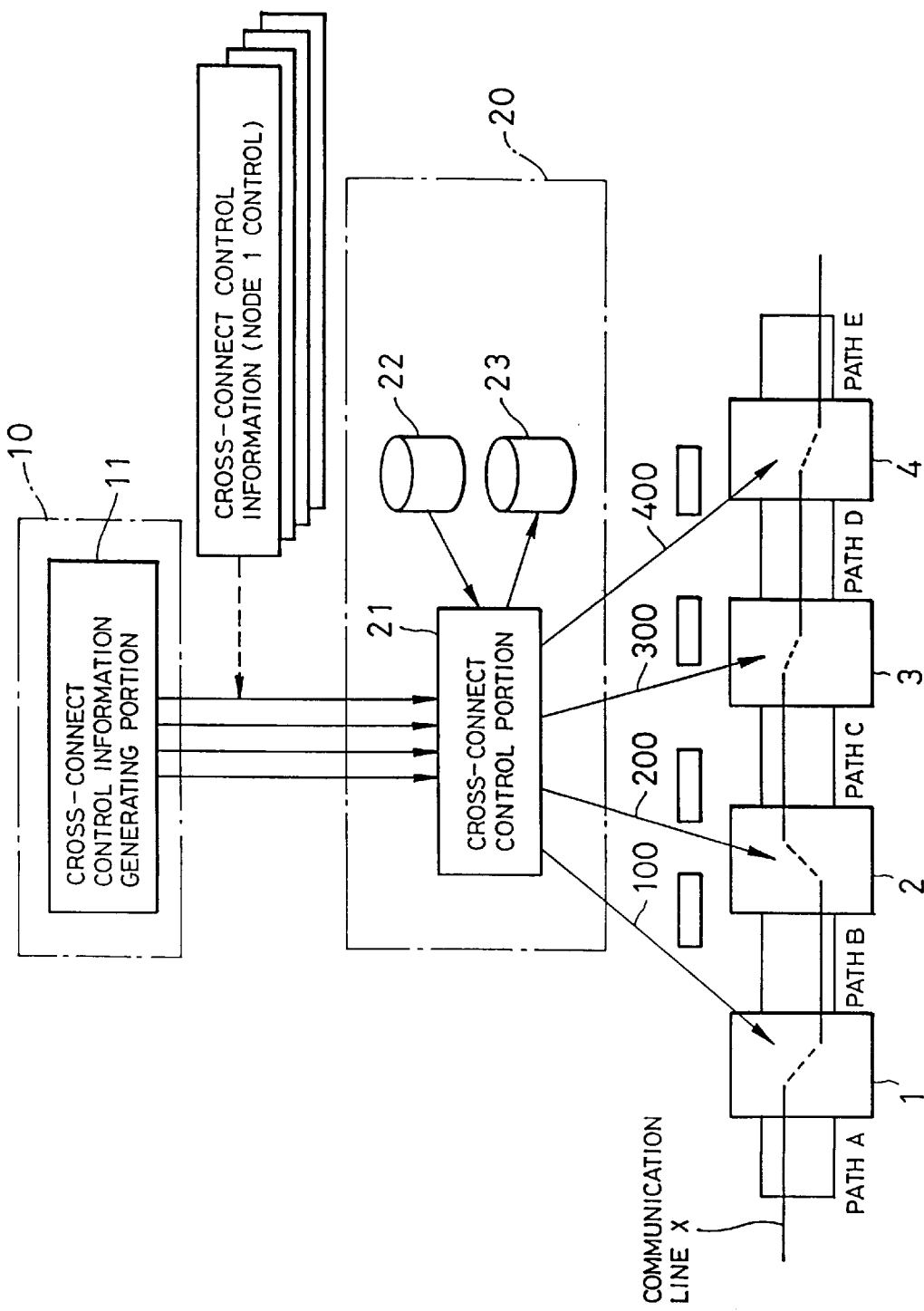

FIG.6  PRIOR ART

| CROSS-CONNECT CONTROL INFORMATION (NODE 1 CONTROL) | |
|---|---|
| LINE NAME (X) | (CHARACTER STRING) |
| LINE SPEED | (INTEGER) |
| CONNECTION TYPE : CROSS-CONNECT | (INTEGER) |
| CONTROL OBJECTIVE NODE NUMBER (NODE 1) | (INTEGER) |
| SENDER PATH NAME (PATH A) | (CHARACTER STRING) |
| SENDER LEADING TIME SLOT NUMBER | (INTEGER) |
| DESTINATION PATH NAME (PATH B) | (CHARACTER STRING) |
| DESTINATION LEADING TIME SLOT NUMBER | (INTEGER) |

× 4 TIMES

DATA SIZE OF CROSS-CONNECT CONTROL INFORMATION
(PER ONE CROSS-CONNECT CONTROL INFORMATION)
[INTEGER DATA × 5 + CHARACTER STRING DATA × 3
 SINCE CROSS-CONNECT CONTROL IS PERFORMED FOR FOUR TIMES
 INTEGER DATA × 20 + CHARACTER STRING DATA × 12]

COMMUNICATION NETWORK CONTROL SYSTEM AND CONTROL METHOD THEREFOR

BACKGROUND OF THE INVENTION

1. Field of the Invention

The present invention relates to a communication network control system and a control method therefor. More specifically, the invention relates to a communication network control system and a control method therefor, which generates a control information for all of nodes, through which respective paths consist a communication line, on the basis of an input by an operator and feeding the control information to respective nodes as a control command.

2. Description of the Related Art

One example of the conventional communication network system of the type, to which the present invention is directed, will be discussed with reference to a block diagram of FIG. 5. Upon control for opening to traffic of a communication line X formed through a plurality of cross connection device 1 to 4 (hereinafter simply referred to as node), a cross-connect control information input by an operator through a man-machine interface device 10 is transmitted to respective nodes 1 to 4 as cross-connect commands 100 to 400 via a network control unit 20.

An example of the cross-connect control information for each node in the shown case is illustrated in FIG. 6. In FIG. 6, there is shown a cross-connect control information relating to a node 1. The cross-connect control information contains a communication line name (X), a communication line speed, a connection type (cross-connect; a portion shown by dotted communication line in the node 1 of FIG. 5), a control objective node number (node 1), a sender path name (path A), a sender leading time slot number, a destination path name (path B) and a destination time slot number.

The cross-connect control information of such construction are supplied to a cross-connect control portion 21 of a network control unit 20 generated per nodes in a form shown in FIG. 6 by a cross-connect control information generating portion 11.

The cross-connect control portion 21 stores the cross-connect control information per node in a cross-connect control information management database (DB) 23 and generates commands 100 to 400 for respective nodes 1 to 4 with making reference to a path construction information management database (DB) 22.

It should be noted that the following is the reason why the leading time slot numbers and communication line speeds of the sender and the destination are required as the cross-connect control information relating to the communication line X. For example, when a channel of 64 KHz per one channel is multiplexed into 24 channels to transmit through a communication line of 1.55 MHz, a leading end position of the data can be detected by the leading time slot number and a data width (length) can be detected based on the communication line speed. Therefore, the leading time slot number and the communication line speed are included in the content of the cross-connect control information.

Here, considering the cross-connect control information for each of the nodes, through which the communication line X passes, between mutually opposing nodes, the sender path name, the destination path name, the sender leading time slot number and the destination leading time slot number become the same values with each other.

Accordingly, the amount of control information transmitted and received between the man-machine interface device 10 and the network control unit 20 has approximately double redundancy as a whole for a series of control information up to the opening of traffic of the communication line. Transmission and reception of the control information having double redundancy between the man-machine interface device 10 and the network control unit 20 has been a factor of lowering of processing performance of opening communication line to traffic by cross-connect control.

SUMMARY OF THE INVENTION

The present invention has been worked out for solving the drawbacks in the prior art. Therefore, it is an object of the present invention to provide a communication network control system which can significantly reduce the amount of control information to be transmitted and received between a man-machine interface device and a network control unit.

According to one aspect of the present invention, a communication network control system comprises:

control information generating means for generating and transmitting control information for all of nodes, through which each path forming a communication line passes, on the basis of input by an operator; and network control means for receiving the control information to transmit to respective nodes as control command to respective node;

the control information generating means including;

means for establishing an intensive ("composite") information of a sender path name and a destination path name between mutually opposing (adjacent) nodes as aligned in sequential order, of which the communication line passes, on the basis of a cross-connect control information consisted of a sender path name, a sender leading time slot number, a control objective node number, a destination path name and a destination leading time slot number input by the operator;

means for establishing an intensive information of the sender leading time slot number and the destination leading time slot number between the opposing nodes on the basis of the cross-connect control information input by, the operator; and means for generating and transmitting a network control information for the communication line by adding intensive path name and intensive leading time slot number before and after respective node numbers indicative of the control objective nodes.

The network control means may comprise:

means responsive to reception of the network control information from the control information generating means for extracting the path names respectively added to before and after the node number among the network control information to reproduce the sender path name and the destination path name of the node;

means for extracting the leading time slot number respectively added before and after the node number among the network control information to reproduce the sender leading time slot number and the destination leading time slot number of the node; and means for re-constructing the extracted sender path name, the destination path name, the sender leading time slot number and the destination leading time slot number as the cross-connect control information of each of corresponding node.

Also, the network control means may include storage-means for storing the cross-connect control information per each node. Furthermore, the network control means may include means for transmitting the cross-connect control information per each node as a command.

According to another aspect of the present invention, a communication network control method comprises:

control information generating step of generating and transmitting control information for all of nodes, through which each path forming a communication line passes, on the basis of input by an operator; and network control step of receiving the control information to transmit to respective nodes as control command to respective node;

the control information generating step including;

step of establishing an intensive information of a sender path name and a destination path name between mutually opposing nodes as aligned in sequential order, of which the communication line passes, on the basis of a cross-connect control information consisted of a sender path name, a sender leading time slot number, a control objective node number, a destination path name and a destination leading time slot number input by the operator;

step of establishing an intensive information of the sender leading time slot number and the destination leading time slot number between the opposing nodes on the basis of the cross-connect control information input by the operator; and step of generating and transmitting a network control information for the communication line by adding intensive path name and intensive leading time slot number before and after respective node numbers indicative of the control objective nodes.

The network control step may comprise:

step responsive to reception of the network control information from the control information generating step, of extracting the path names respectively added to before and after the node number among the network control information to reproduce the sender path name and the destination path name of the node;

step of extracting the leading time slot number respectively added before and after the node number among the network control information to reproduce the sender leading time slot number and the destination leading time slot number of the node; and step of re-constructing the extracted sender path name, the destination path name, the sender leading time slot number and the destination leading time slot number as the cross-connect control information of each of corresponding node.

The network control step may include step storing the cross-connect control information per each node in a storage means. Also, the network control step may include step of transmitting the cross-connect control information per each node as a command.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 2 is an illustration showing an example of an intensive network control information in the preferred embodiment of the present invention;

FIG. 3 is a flowchart showing an operation of a network control information generating portion of FIG. 1;

FIG. 5 is a block diagram showing the conventional communication network control system; and FIG. 6 is an illustration showing one example of a cross-connect control information in the system of FIG. 5.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessarily obscuring the present invention.

Figure 1:
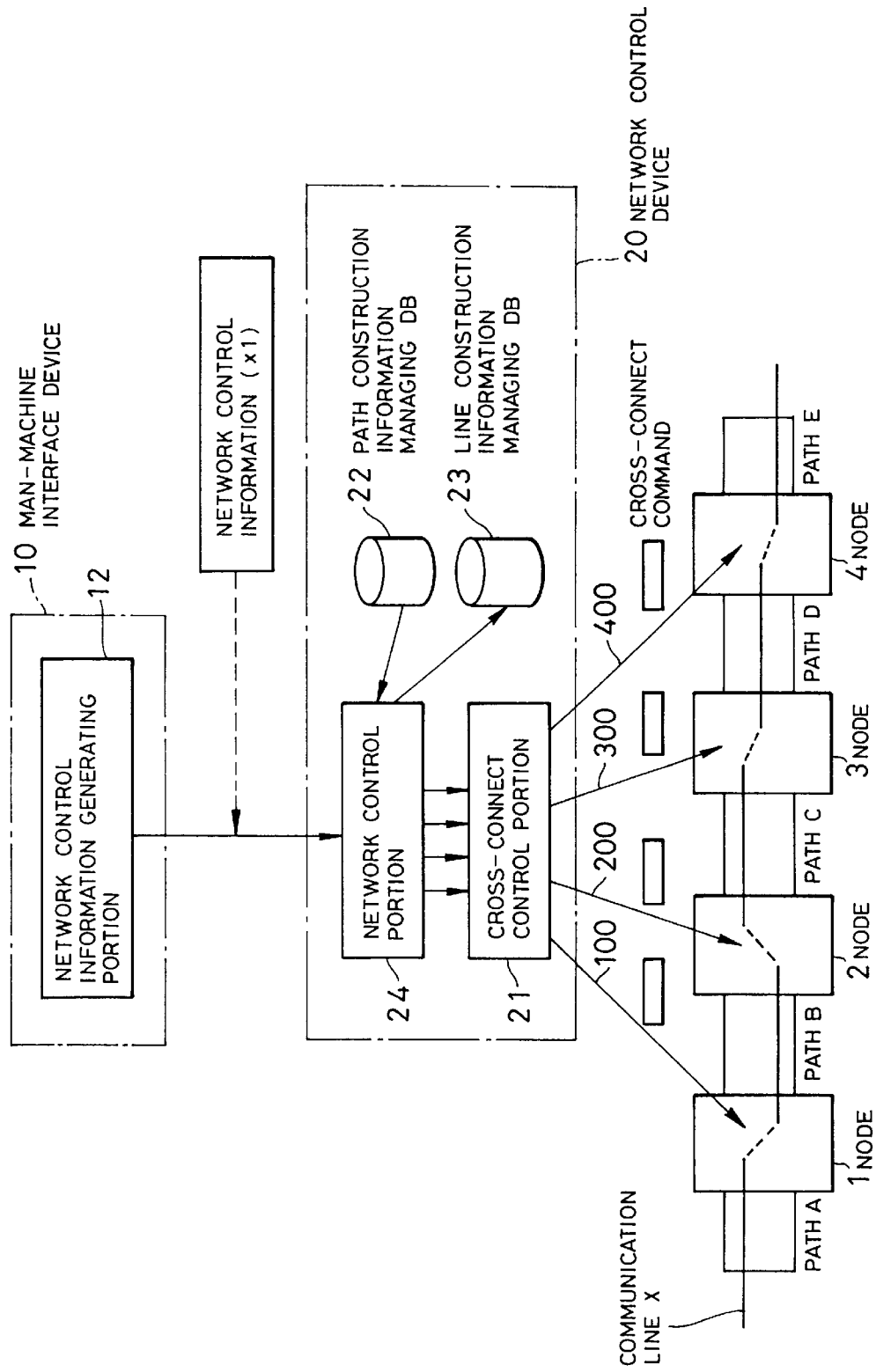
FIG. 1 is a block diagram showing the preferred embodiment of a communication network control system according to the present invention.

FIG. 1 is a block diagram of the preferred embodiment of a communication network control system according to the present invention. In the following discussion, like components to those illustrated in FIG. 5 will be identified by like reference numerals and detailed discussion for such common components will be neglected for avoiding redundant discussion and simplification of disclosure to facilitate clear understanding of the present invention. A network control information generating portion 12 in the man-machine interface device 10 generates an intensive network control information shown in FIG. 2 on the basis of a plurality of cross-connect control information (control information adapted respectively for nodes 1 to 4), each consisting of a sender path name, a sender leading time slot number, a control objective node number, a destination path name, a destination leading time slot number, and an input by an operator, for transmission.

A network control portion 24 of the network control unit 20 receives one intensive network control information and re-constructs cross-connect control information (see FIG. 6) for respective of nodes 1 to 4.

The cross-connect control portion 21 transmits the cross-connect control information for respective node to the nodes 1 to 4 as commands 100 to 400.

Other constructions are equivalent to those of FIG. 5, and detailed discussion therefor will be neglected.

FIG. 3 is a flowchart showing operation of the network control information generating portion 12 of FIG. 1. Referring to FIG. 3, through the man-machine interface device 10, the cross-connect control information (four kinds of cross-connect control information respectively adapted to nodes 1 to 4) consisting of the sender path name, the sender leading time slot number, the control objective node number, the destination path name, and the destination leading time slot number with respect to the communication line X are input by the operator per respective nodes 1 to 4 (301).

In response to this, the network control information generating portion 12 puts together the destination path name and sender path name of the opposing two nodes when aligning all nodes 1 to 4 in sequential order, in which the communication line X passes, into single network control information (302).

For example, in consideration of the node 1 and the node 2, since the sender path name of the node 1 and the destination path name of the node 2 are both B, both are put as the path name B. Similarly this is true with respect to other opposing nodes 2–3 and nodes 3–4.

Similarly, in the node 1 and node 2, since the sender leading time slot number of the node 1 and the destination leading time slot number of the node 2 are the same, both are put as the same leading time slot number (303). Similarly this true with respect to other opposing nodes 2–3 and nodes 3–4.

Then, as shown in FIG. 2, before and after the respective node number, the intensive path name and leading time slot number are added, respectively, to establish a single network control relating to the communication line X (304). It should be noted that, as shown in FIG. 2, the information of the communication line name, connection type and so forth are naturally added.

The single network control information thus generated is transmitted to the network control unit 20 (305).

Figure 4:
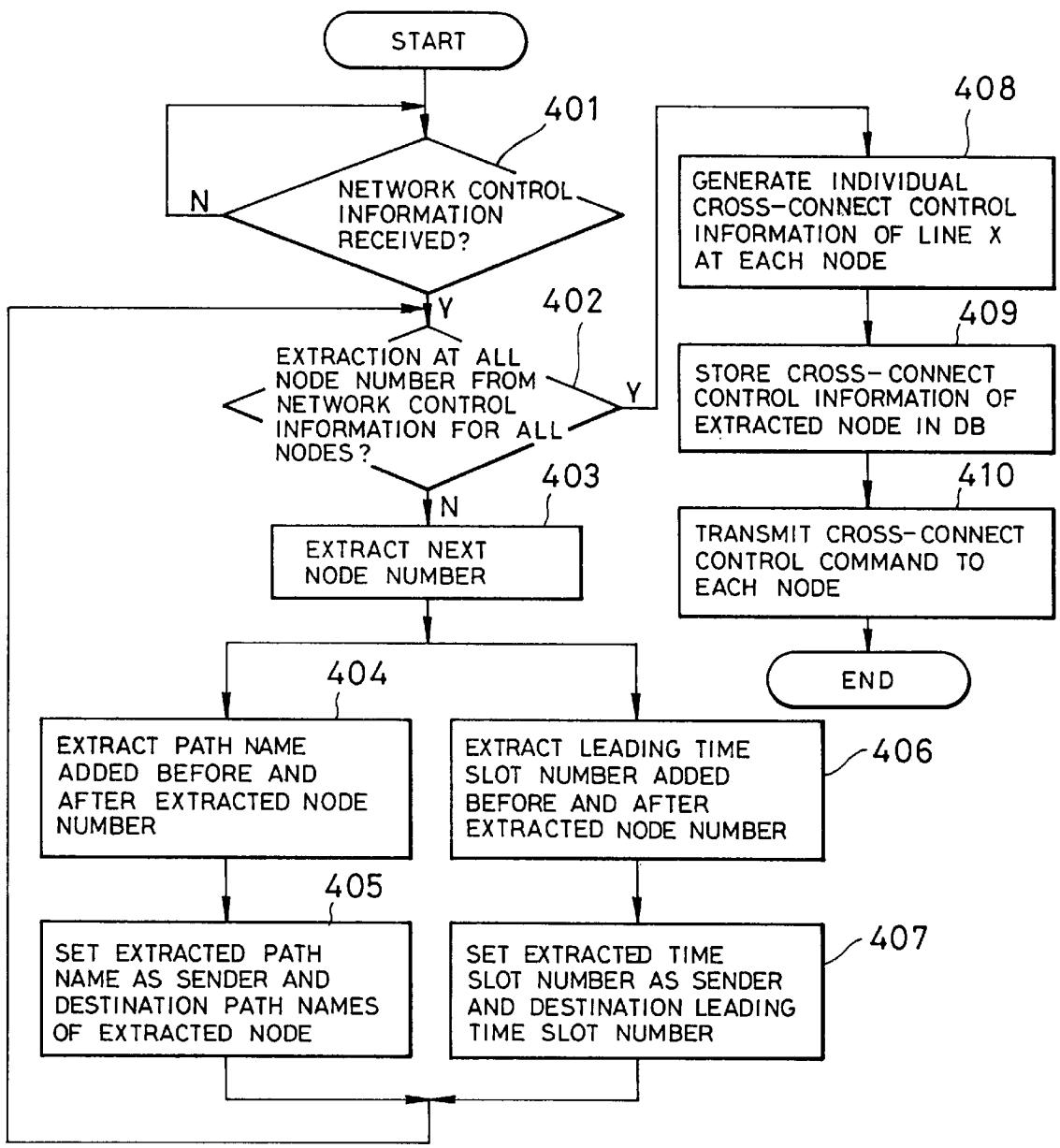
FIG. 4 is a flowchart showing an operation of the network control portion of FIG. 1.

FIG. 4 is a flowchart showing operation of a network control portion 24 in the network control unit 20. Referring to FIG. 4, when the single network control information shown in FIG. 2 is received from the man-machine interface device 10 (401), the node number from the network control information is sequentially extracted from the smaller number, for example (402, 403).

The path names added before and after the extracted node number are extracted (404). When the extracted node number is "2", the path name added before and after the node number 2 are respectively B and C. Accordingly, the sender path name is set as B and the destination path name is set as C, respectively (405). A similar process is performed with respect to other node numbers (402, 403).

On the other hand, the leading time slot number added before and after the extracted node number is extracted (406). In this case, the leading time slot number added before the node number is the sender leading time slot number, and the leading time slot number added after the node number is the destination leading time slot number (407). The cross-connect control information of each node is re-constructed as shown in FIG. 6.

Thus, the cross-connect control information for each individual node re-constructed is stored in a data base 23 (409). Also, the cross-connect information is transmitted to the cross-connect control portion 21, through which the cross-connect information is transmitted to respective nodes as the cross-connect control command 100 to 400 (410).

The effect of the present invention will be provisionally estimated with regard to the construction shown in FIGS. 2 and 6 as an example.

In the conventional system, assuming that the cross-connect control information consists of five 2-byte type integer data and three character string data, each containing 60 characters per one frame, the data size of the cross-connection control information per one frame is 2 bytes (integer data size)×5+60 bytes (character string data size)× 3=190 bytes.

Assuming that the 190-byte data is transmitted and received through four cross-connect devices, the data size on communication becomes 190 bytes×4=760 bytes.

Therefore, 760 bytes of data are required to be transmitted and received between the man-machine interface device and the network control unit up to opening the communication line to traffic.

On the other hand, in the system according to the present invention, the network control information consists of eleven 2-byte type integer data and six character string data, each contains 60 characters per one frame. Therefore, the data size of the network control information is 2 bytes (integer data size)×11+60 bytes (character string data size)×6=382 bytes.

Therefore, 382 bytes of data are required to be transmitted and received between the man-machine interface device and the network control unit up to opening the communication line to traffic.

Accordingly, reduction rate of the data size is

382/760=50.2%

Thus, approximately 50% of data to be transmitted and received can be reduced.

As set forth above, according to the present invention, in the man-machine interface device according to the present invention, the redundant information in the cross-connect control information of respective nodes is edited into a single network control information to transmit to the network control device. Therefore, information amount between the man-machine interface device and the network control device can be significantly reduced.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A communication network control system comprising:

control information generating means for generating and transmitting control information for all network nodes, through which each path forming a communication line passes, on the basis of cross-connect control information input by an operator; and network control means for receiving said control information and transmitting it to respective nodes as control commands for the respective nodes;

said control information generating means including:

means for establishing intensive information of a sender path name and a destination path name between mutually opposing, sequentially aligned nodes, through which the communication line passes, on the basis of said cross-connect control information input by the operator and including, for each node, a sender path name, a sender leading time slot number, a control objective node number, a destination path name and a destination leading time slot number;

means for establishing intensive information of said sender leading time slot number and said destination leading time slot number between said opposing nodes on the basis of said cross-connect control information input by the operator; and means for generating and transmitting network control information for said communication line by adding intensive information of said sender path name and said destination path name, and intensive information of said sender leading time slot number and said destination leading time slot number before and after each node number.

2. A communication network control system as set forth in claim 1, wherein said network control means comprises:

means for extracting said sender and destination path names respectively added before and after said node number from said network control information to reproduce the sender path name and the destination path name of the node, in response to reception of said network control information from said control information generating means;

means for extracting said sender and destination leading time slot numbers respectively added before and after said node number from said network control information to reproduce the sender leading time slot number and the destination leading time slot number of the node; and means for reconstructing the extracted sender path name, the destination path name, the sender leading time slot number and the destination leading time slot number as the cross-connect control information for each corresponding node.

3. A communication network control system as set forth in claim 2, wherein said network control means includes storage means for storing the cross-connect information for each node.

4. A communication network control system as set forth in claim 2, wherein said network control means includes means for transmitting the cross-connect control information for each node as a command.

5. A communication network control method comprising:

a control information generating step of generating and transmitting control information for all network nodes, through which each path forming a communication line passes, on the basis of cross-connect control information input by an operator; and a network control step of receiving said control information and transmitting it to respective nodes as control commands for the respective nodes;

said control information generating step including:

a step of establishing intensive information of a sender path name and a destination path name between mutually opposing, sequentially aligned nodes, through which the communication line passes, on the basis of said cross-connect control information input by the operator and including, for each node, a sender path name, a sender leading time slot number, a control objective node number, a destination path name and a destination leading time slot number;

a step of establishing intensive information of said sender leading time slot number and said destination leading time slot number between said opposing nodes on the basis of said cross-connect control information input by the operator; and a step of generating and transmitting network control information for said communication line by adding intensive information of said sender path name and said destination path name, and intensive information of said sender leading time slot number and said destination leading time slot number before and after each node number.

6. A communication network control method as set forth in claim 5, wherein said network control step comprises:

a step of extracting said sender and destination path names respectively added before and after said node number from said network control information to reproduce the sender path name and the destination path name of the node, in response to reception of said network control information from said control information generating step, a step of extracting said sender and destination leading time slot numbers respectively added before and after said node number from said network control information to reproduce the sender leading time slot number and the destination leading time slot number of the node; and a step of reconstructing the extracted sender path name, the destination path name, the sender leading time slot number and the destination leading time slot number as the cross-connect control information for each corresponding node.

7. A communication network control method as set forth in claim 6, wherein said network control step includes the step of storing the cross-connect control information for each node in a storage means.

8. A communication network control method as set forth in claim 6, wherein said network control step includes the step of transmitting the cross-connect control information for each node as a command.

9. A communication network control system comprising:

a network control information generating portion, included in a man machine interface device, for generating and transmitting control information for all network nodes, through which each path forming a communication line passes, on the basis of cross-connect control information input by an operator; and a network control device including:

a network control portion for receiving said control information from said network control information generating portion and further transmitting said control information to the respective nodes;

a cross-connect control portion for generating cross-connect control commands from said cross-connect control information received from said network control portion and transmitting said cross-connect control commands to each respective node;

said control information generating portion establishing intensive information of a sender path name and a destination path name between mutually opposing, sequentially aligned nodes, through which the communication line passes, based upon cross-connect control information input by the operator, and including, for each node, a sender path name, a sender leading time slot number, a control objective node number, a destination path name and a destination leading time slot number, said control information generating portion further establishing intensive information of said sender leading time slot number and said destination leading time slot number between said opposing nodes on the basis of said cross-connect control information input by the operator, and said control information generating portion generating and transmitting network control information for said communication line by adding intensive information of said sender path name and said destination path name, and intensive information of said sender leading time slot number and said destination leading time slot number, created by said control information generating portion, before and after each node number;

said network control portion extracting the sender and destination path names respectively added before and after said node number from said network control information to reproduce the sender path name and the destination path name of a network node, in response to reception of said network control information from said network control information generating portion, said network control portion also extracting the leading time slot numbers respectively added before and after said node number among said network control information to reproduce the sender leading time slot number and the destination leading time slot number of the node, said network control portion further reconstructing the extracted sender path name, destination path name, sender leading time slot number and destination leading time slot number as the cross-connect control information for each corresponding node.

10. A communication network control system as set forth in claim 9, wherein said network control device includes a database for storing the cross-connect information for each node.

* * * * *